US012645619B2

(12) United States Patent
Reibetanz

(10) Patent No.: US 12,645,619 B2
(45) Date of Patent: Jun. 2, 2026

(54) BUS SYSTEM AND METHOD FOR ALLOCATING ADDRESSES OF BUS NODES IN A BUS SYSTEM

(71) Applicant: Pepperl+Fuchs SE, Mannheim (DE)

(72) Inventor: Clemens Reibetanz, Mannheim (DE)

(73) Assignee: Pepperl+Fuchs SE, Mannheim (DE)

( * ) Notice: Subject to any disclaimer, the term of this patent is extended or adjusted under 35 U.S.C. 154(b) by 11 days.

(21) Appl. No.: 18/919,499

(22) Filed: Oct. 18, 2024

(65) Prior Publication Data

US 2025/0156352 A1      May 15, 2025

(30) Foreign Application Priority Data

Nov. 10, 2023    (EP) .................................... 23209127

(51) Int. Cl.
*G06F 13/20*           (2006.01)
(52) U.S. Cl.
CPC .......... *G06F 13/20* (2013.01); *G06F 2213/40* (2013.01)
(58) Field of Classification Search
CPC ... G06F 13/20; G06F 2213/40; H04L 12/403; H04L 61/5038; H04L 12/10
See application file for complete search history.

(56) References Cited

U.S. PATENT DOCUMENTS 5,422,631 A * 6/1995 Gertz ....................... H04Q 9/14
370/449
2017/0222275 A1* 8/2017 Krishnan ............ H01M 10/425
2018/0191514 A1 7/2018 Erdmann
2018/0192499 A1 7/2018 Wilson

FOREIGN PATENT DOCUMENTS

DE    102006030706    1/2008
EP    2209262    7/2010
WO    2016184889    11/2016

* cited by examiner

*Primary Examiner* — Farley Abad
(74) *Attorney, Agent, or Firm* — Blueshift IP; Robert Plotkin

(57)                ABSTRACT

The invention relates to a control node (3) for a bus system (1), wherein the control node (3) is adapted to control a number of devices (6); comprising: a control unit (31) configured to send an address-request-signal as soon as supply power is applied onto the control node (3) via at least one power supply line (7) at a first or second power supply terminal (33, 34) and to receive an address-allocation-signal including a unique address via at least one data line (8); a switching unit (32) which is configured to electrically interconnect the first and second power supply terminal (33, 34) immediately and directly after control unit detects that the address-allocation-signal has been received.

7 Claims, 2 Drawing Sheets

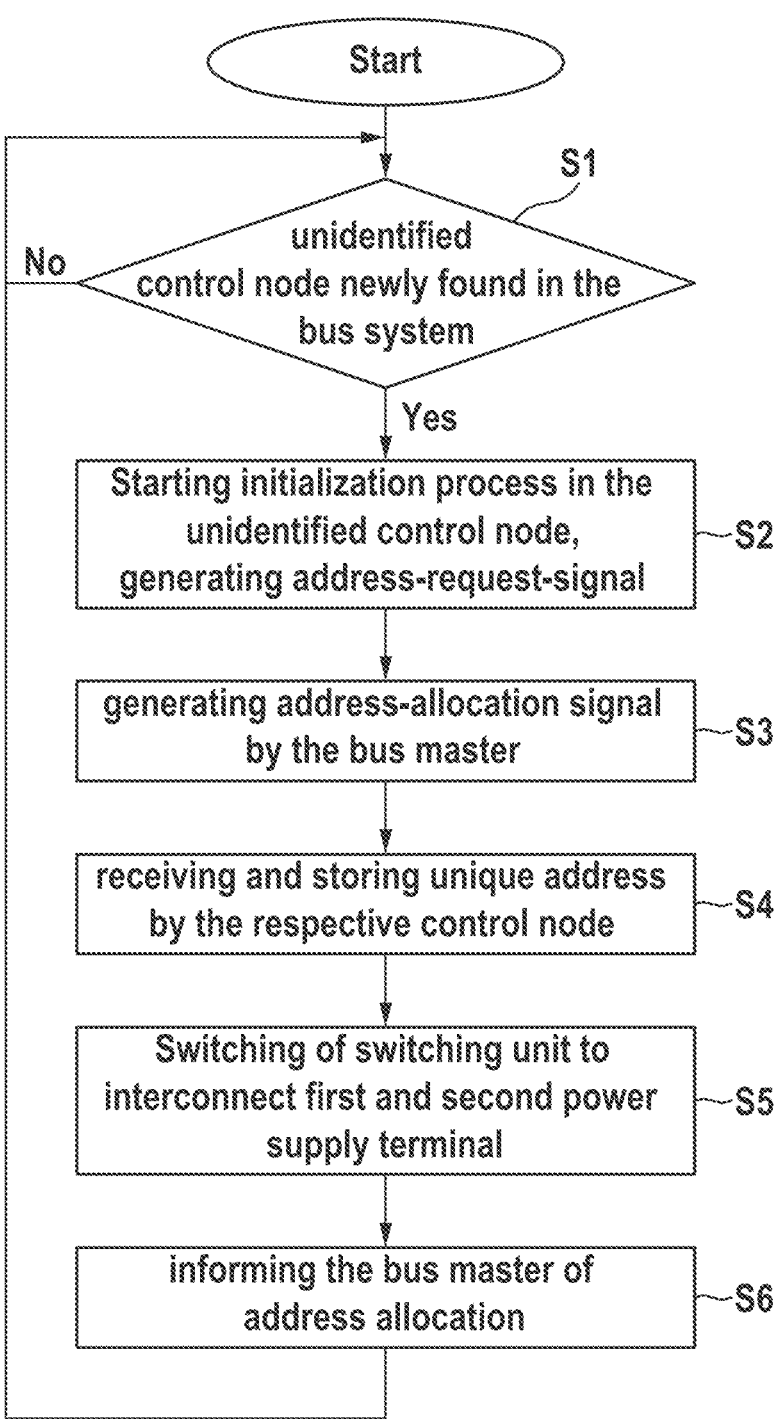

Start

S1

No ← unidentified control node newly found in the bus system

Yes

Starting initialization process in the unidentified control node, generating address-request-signal ⎯S2 generating address-allocation signal by the bus master ⎯S3 receiving and storing unique address by the respective control node ⎯S4

Switching of switching unit to interconnect first and second power supply terminal ⎯S5 informing the bus master of address allocation ⎯S6

Fig. 3

BUS SYSTEM AND METHOD FOR ALLOCATING ADDRESSES OF BUS NODES IN A BUS SYSTEM

TECHNICAL FIELD

The invention relates to automation systems with multiple zones, each comprising one or more control nodes. The present invention relates to communication between the control nodes by a bus system, particularly to allocate bus addresses to multiple control nodes.

TECHNICAL BACKGROUND

In the field of automation, bus systems are used to allow a communication between multiple control nodes and a bus master. The communication via the bus is made using individual addresses for each of the control nodes connected in the bus system.

For instance, a bus system, such as a CAN bus, can be used which has at least one data line and at least one power line. The data lines are unshielded and interconnect the control nodes to enable data communication. The at least one power line serves to provide a power supply to each of the control nodes.

A bus master is provided for multiple control nodes which can be a gateway, for example, which may itself be connected to a higher-level field bus of an industrial automation system. The bus system for communicating with the control nodes may then act as a sub-bus system for the field bus and enables a selective control of individual physical devices connected with each of the control nodes.

In general, these individual physical devices may include switching devices, electrical drives, sensors, actuators and the like to perform physical and sensing operations.

Commonly, bus systems used in the field of automation systems usually do require a simple and robust structure for communicating with the control nodes, such as given by e.g. a CAN bus or the like.

A typical structure for such a CAN bus system includes two data lines and two power supply lines. So, a bus system with only four lines can both supply the control nodes with power and establish data communication between the bus master, the control nodes with a sufficient transmission bandwidth.

For individually controlling the devices with the control nodes, a unique address has to be allocated to each of the control nodes by the bus master. Various methods are known including manually setting the individual address for each control node, e.g. by means of dip switches.

Moreover, automatic address allocation in an initialization phase is known. For instance, from document DE 10 2006 030 706 B4, an addressing method is known where bus stations are permanently connected to the bus master via power supply lines and data lines. In addition, the bus has a control line that runs from the bus master to a first bus station and is looped through from the first bus station to a next bus station in the form of a daisy chain. The daisy chain labels automatic address allocation by successively connecting the bus stations with the control line so that an address can be allocated to the latest connected node. However, an additional control line is required in this approach.

From document WO 2016/184889 A1, a method for allocating addresses of bus subscribers by a bus master is known where the bus subscribers are connected to the bus master via a bus having at least one data line and at least one power supply line for the bus subscribers. At least one data line is routed from the bus master to all bus subscribers, and the power supply line is routed from the bus master to a first of the bus subscribers and is looped through the first bus subscribers to a further bus subscriber via a switching element in the first bus subscriber. To allocate addresses to the first bus subscriber, a supply voltage is supplied to the first bus subscriber via the power supply line. A first address is transmitted to the first bus subscriber by the bus master. The first address is received and stored by the first bus subscriber, and the switching member of the first bus subscriber is actuated to apply the power supply voltage to the next bus subscriber via a next section of the power supply line.

After allocating the address to the respective bus subscriber, the bus master waits for an acknowledgement signal acknowledging that the address has been associated with the respective bus subscriber. Only if the acknowledgement signal has been received by the bus master, the bus master has to actively command the respective bus subscriber to switch the switching element. This procedure may lead to an unintentional stuck of the initialization process in cases where the acknowledgement or command signal are disturbed or not fully received.

It is an object of the present invention to provide a bus system and a method for allocating addresses to control nodes of a bus system, in which the risk that the initialization process becomes stuck is significantly reduced.

SUMMARY OF THE PRESENT INVENTION

This object has been achieved by the bus system including a bus master and control nodes according to claim 1 as well as the method or allocating actual addresses to control nodes in the bus system according to a further independent claim.

Further embodiments are indicated in the depending subclaims.

According to a first aspect, a control node for a bus system is provided, wherein the control node is adapted to control a number of devices; comprising:

a control unit configured to send an address-request-signal as soon as supply power is applied onto the control node via at least one power supply line at a first or second power supply terminal and to receive an address-allocation-signal including a unique address via at least one data line;

a switching unit which is configured to electrically interconnect the first and second power supply terminal immediately and directly after the control unit detects that the address-allocation-signal has been received.

According to a further aspect, a bus system is provided comprising:

The above control node;

a bus master which is configured to receive an address-request-signal and to immediately transmit an address-allocation signal in response via the at least one data line.

The bus system for communicating with multiple control nodes comprises at least one power supply line and at least one data line. The at least one data line is connected with each of the control nodes. The transmission of signals may be controlled by the bus master which transmits control signals and commands an addressed control node to acknowledge or to provide data via the at least one data line. In other embodiments, the bus master only allocates the addresses, and the control nodes may directly communicate with each other. In particular, each control node may assume the addresses of the neighboring control nodes by decrementing the address by 1 to obtain the address for the preceding node and by incrementing the address by 1 to obtain the address for the succeeding control node.

According to an embodiment, the at least one data line may be provided which interconnects all control nodes and the bus master, wherein the at least one power supply line has portions to provide point-to-point interconnections between the bus master and one of the first and second power supply terminal of a control node or between one of the first and second power supply terminal of one of the control nodes and one of the first and second power supply terminals of a further one of the control nodes.

The control nodes are successively serially connected to the bus master and to each other via multiple portions of the at least one power supply line, wherein the each of the multiple portions of the at least one power supply line connects the bus master with a first control node or connecting two control nodes, respectively.

Each control node has a first and a second power supply terminal for connecting to one or only one portion of the at least one power supply line. One portion of the at least one power supply line coming from the bus master is connected with the first power supply terminal of a first control node, and the second power supply terminal of the first control node is connected with a further portion of the at least one power supply line. The further portion of the at least one power supply line is connected to a first terminal of a next control node. The portion of the at least one power supply line therefore provided a point-to-point-connection between a second power supply terminal of one control node and a first power control node of a next control node.

In each of the control nodes, between the first and second power supply terminals of a respective control node, a switching unit is provided to selectively allow a connecting or disconnecting of the portions of the at least one power supply line connected to the respective control node. Furthermore, the switching unit is configured to allow power supply to the respective control node once a supply voltage is applied, however connection between the first and second power supply terminals is only established by a switching control command generated by a control unit of the respective control node. With this configuration, the control nodes are connected in the form of a daisy chain with respect to the portions of the at least one power supply line.

So, in an initial state, the portions of the at least one power supply line are firstly electrically separated by the switching unit in each of the control nodes. The control nodes are configured so that the switching units are opened as long as no power is supplied to the respective control node.

In an initialization process, addresses are allocated to each of unidentified (not provided with a unique address) control nodes successively. For the described initialization process, it makes no difference if one or multiple daisy chain connected control nodes are connected with the bus master or with a control node already provided with a unique address.

For allocating the unique addresses to each of the control nodes, according to the initialization process, the bus master receives an address-request-signal each time when a control node is connected with the bus system and power is supplied to the newly connected control node. When being connected, the control node is configured to receive power supply by the respective first (or second) power supply terminal. Powering the control unit in the control node effects the generation of the address-request-signal onto the at least one data line.

The address-request-signal is received by the bus master, which in response provides an address-allocating signal containing a unique address for the respective control node via the at least one data line to the respective control node. In the bus master the unique address is associated to the respective control node and stored in the bus master accordingly.

The control node is further configured that immediately after receiving the address-allocating signal, the switching unit is controlled by the control unit to be closed thereby providing an electrical interconnection between the first power supply terminal and the second power supply terminal so that a next portion of the at least one power line is powered, i.e. connected to the power supply. In other words, directly and immediately means that controlling of the switching unit to close is made without any further command received by the bus master and is only controlled by the control node itself after receiving the address-allocating signal.

As soon as a further control node receives power supply by the newly powered portion of the at least one power supply line, the above initialization process is started again. Accordingly, in the respective further control node an address-request-signal is issued on the at least one data line. The address-request-signal is once again received by the bus master, which provides a further address-allocating signal containing another unique address onto the at least one data line which is then received by the respective further control node. The further control node then closes the respective switch immediately after the unique address has been registered in the control node. This process can be repeated as long as unidentified control nodes are connected with the respective portions of the power supply line which do not have a registered unique address yet.

It may be provided that the control unit is configured to acknowledge the allocation of a unique address to the bus master after receiving the address-allocation-signal.

It may be provided that the switching unit includes a first forward polarized diode between the first power supply terminal and the control unit and a second forward polarized diode between the second power supply terminal and the control unit. A first bypass switch is provided in parallel to the first forward polarized diode configured to bypass the first diode so as to when power is supplied via the respective portion of the at least one power supply line connected to the first power supply terminal, the control unit is powered. A second bypass switch is provided in parallel to the second forward polarized diode and configured to bypass the second diode so as to when power is supplied via the respective portion of the at least one power supply line connected to the second power supply terminal, the control unit is powered. The control unit is configured to control the respective bypass switch to close via which the control unit is provided with power supply immediately after powering on.

Particularly, the control unit may be configured to control the remaining open bypass switches to close after the address-allocation signal has been received.

Hence, the switching unit may have forward polarized diodes connected between each power supply terminal and the control unit, which allows the powering of the control unit of the control node as soon as a power supply voltage is applied to one of the power supply terminals.

Once power supply is applied to the control unit the initialization process is started. In case each power supply terminal is connected via a forward-polarized diode with the control unit, powering of the control node may be made by each of the power supply terminals thereby facilitating the installation of the control node in the bus system as the portion of the at least one power supply line can be arbitrarily connected to any of the power supply terminals.

Further, the power supply is provided to the control unit via a common power supply node which is connected with each of the diodes and each of the bypass switches.

When the initialization process has been started, the bypass switch is closed, which bypasses the respective diode on which power is supplied to the control unit.

It may be provided, that as soon as power is supplied to the control unit, the first or second diode by which the power is supplied to the control unit is detected, and the respective bypass switch associated with the respective diode is closed (conducting) while the other switch(es) remain(s) opened (non-conducting). Once, the address-allocating signal including the unique address has been received by the control unit, the other bypass switch(es) is/are closed forming a direct interconnection between the first and second power supply terminals and thereby starting powering the further portion of the power line which has not been applied with power supply before.

Furthermore, the control unit may be configured to store the unique address after receiving the address-allocation-signal.

The above bus system and method allows to quickly and efficiently allocate unique addresses to control nodes of a bus system, avoiding an issue that the initialization process stucks when an acknowledgement signal or a switching signal has not been transmitted properly via the data line.

According to a further aspect, a method for operating a control node for a bus system is provided, wherein the control node is adapted to control a number of devices; comprising the steps of:

After detecting application of a power supply onto the control node via at least one power supply line at a first or second power supply terminal, transmitting an address-request-signal via an at least one data line;

Waiting to receive or receiving an address-allocation-signal including a unique address via the at least one data line;

electrically interconnecting the first and second power supply terminal immediately and directly after detecting that the address-allocation-signal has been received.

BRIEF DESCRIPTION OF THE DRAWINGS

Embodiments are described in more detail in conjunction with the accompanying drawings, in which:

FIG. 3 shows a flow chart which illustrates a method for allocating a unique address to each control node.

DESCRIPTION OF EMBODIMENTS

Figures 1, 2:
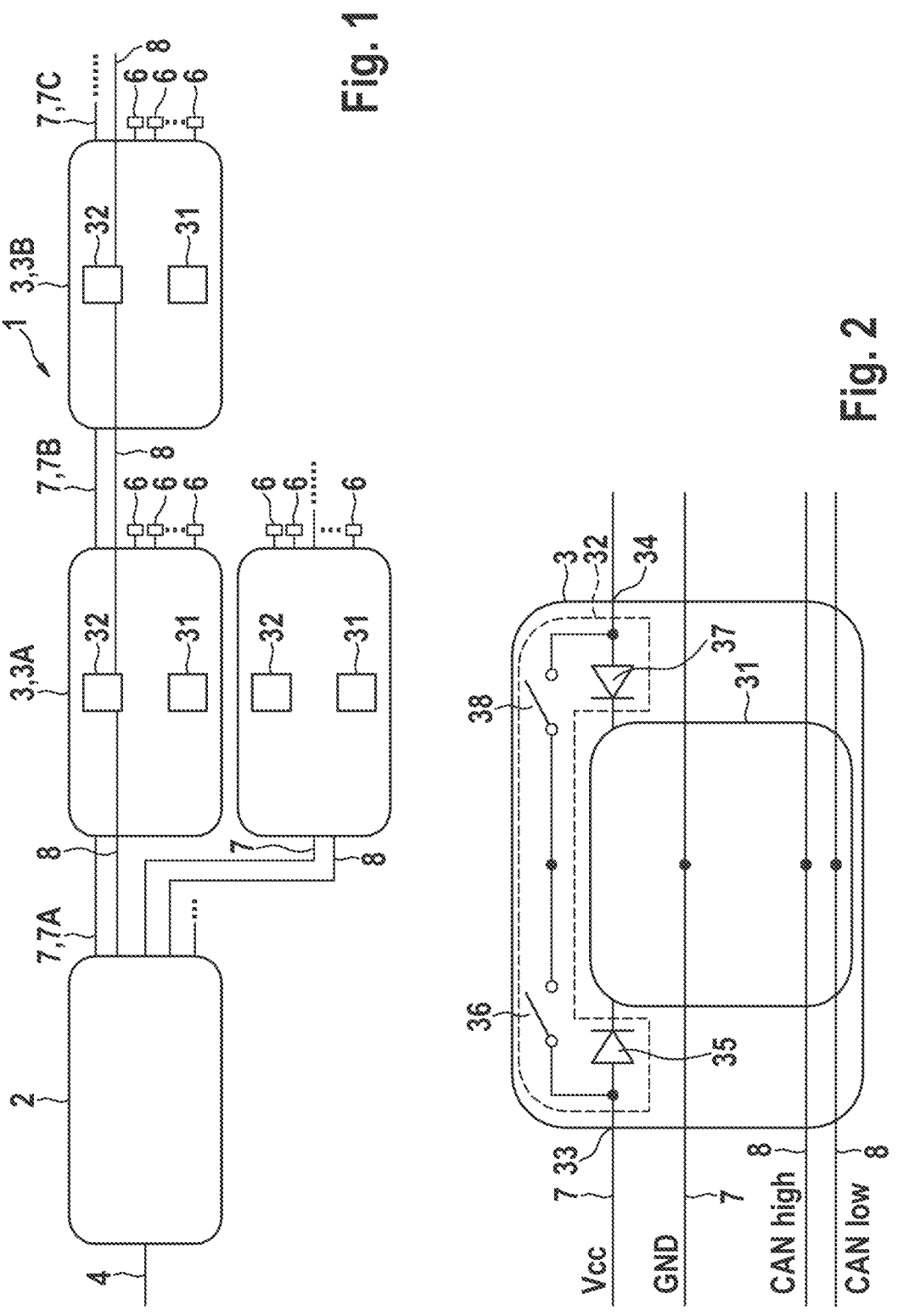
FIG. 1 schematically shows a bus system comprising a bus master and a number of control nodes.
FIG. 2 shows in more detail a control node including a switching unit with interchangeable terminals for connecting the power line.

FIG. 1 schematically shows a bus system 1 with a bus master 2 and multiple control nodes 3. External communication with the control nodes 3 is made via the bus master 2 which may be in connection with a field bus 4 or the like. The bus master 2 is connected with the control nodes 3 via power supply lines and data lines fed through all of the control nodes 3.

The control nodes 3 each comprises a control unit 31 and a switching unit 32 and may be further connected with at least one device 6, including at least one of one or more actuators such as motors, drives and the like and/or measurement sensors. The at least one device 6 may be controlled by the control unit depending on command received from the bus master 2.

The control unit 31 has implemented a functionality to operate the devices 6, including one or more actuators and/or one or more measurement sensors, particularly depending on commands received by the bus master 2.

As shown in more detail in FIG. 2, the bus system comprises two power supply lines 7 for providing a DC supply voltage and two data lines 8 for transmitting data as differential data signals. Such a bus architecture is common for automation bus systems such as CAN or the like.

Each control node 3 has a first power supply terminal 33 and a second power supply terminal 34 wherein the first power supply terminal 33 of a first of the control nodes 3A is connected via a portion 7A of the power supply line 7 with the bus master 2 and wherein the second power supply terminal 34 of the first control node 3A is connected with a further portion 7B of a power supply line 7 with a first power supply terminal 33 of a further control node 3B.

Between the first power supply terminal 33 and the second power supply terminal 34 of each control node 3, the switching unit 32 is provided which allows an interconnection between the first and second power supply terminal to provide a power supply from one portion of the power supply line 7 to a next portion of the power supply line 7.

In an initial state, i.e. when no power supply is applied or immediately after power has been supplied to the control node but no unique address has been allocated yet, the switching unit 32 disconnects the first and the second power supply terminals 33, 34 from each other.

In FIG. 3, a flow chart is depicted which shows a method for allocating a unique address to each unidentified control node of the bus system. A control node is unidentified if no unique address has been allocated thereto.

In step S1, it is checked in each of the unidentified control nodes that power supply has been newly applied. If positive (alternative: yes), the method continues with step S2, otherwise (alternative: no) the method returns to step S1.

In step S2, once the control node receives power via the first or the second power supply terminal, an initialization process is started. Supplying power to the control unit of the control node, an address-request signal is generated in the control unit and issued via the data lines 8.

In step S3 the request signal is received by the bus master 2 which as a response provides an address-allocation signal including a unique address via the data line 8. The unique address is an address which has not been provided before to any other control node 2.

In step S4, the control node 3 who has sent the address-request signal receives a unique address. The unique address is stored in the control unit 31 so that commands directed to the control node with the unique address can be handled in the control unit.

Triggered by the reception of the unique address, the switching unit 32 is in step S5 controlled by the respective control unit 31 so that the first and second power supply terminals 33, 34 are electrically interconnected and the portion of the power supply line 7 connected with the second power supply terminal 34 or not provided with a power supply before is supplied with power.

Furthermore, in step S6, the bus master 2 may be informed of the correct reception of the unique address in the control node.

The method continues with step S1.

If a further control node 3 is connected with the respective portion of the power supply line 7, it is newly powered, and the initialization procedure is started by issuing an address-request signal onto the data line 8. This results in generation of a further unique address to be supplied via the data line to the respective querying control node and so on.

The above process automatically allocates unique addresses to each of the control nodes which are newly connected to the bus system or which are powered on as one other control node interconnects the first and second power supply terminals thereby applying power to a portion of the power supply line not being powered before.

To have the first and second power supply terminals 33, 34 of each control node 3 to be interchangeable, the switching unit 32 may have a structure which is shown in FIG. 2.

The first power supply terminal 33 is connected with a first forward polarized diode 35 to a common power supply node C of the control unit 31 so that when power is supplied to the first power supply terminal 33 it is directly applied to the control unit 31 due to the forward operation of the first diode. A first bypass switch 36 is connected in parallel to the first diode 35, which bypasses the first diode 35. To compensate for the voltage drop over the first diode, the control unit 31 may close the first switch 36 immediately after powering on to apply the full supply voltage to the control unit 31.

The second power supply terminal 34 is analogously connected via a second forward polarized diode 37 to the common power supply node C of the control unit 31. In parallel to the second diode 37, a second bypass switch 38 is provided. If power is supplied via the second power supply terminal 34 to the control unit 31, the second bypass switch may be closed, thereby bypassing the second diode 37. This allows an interchangeable operation of the first and second power supply terminals 33, 34.

In response to receiving an address-allocating signal including a unique address, the switching unit 32 can be closed to provide an electrical interconnection between the first and second power supply terminals 33, 34 by closing the respective bypass switch(es) which has remained open at the time of providing power supply to the control node 3.

The invention claimed is:

1. A control node (3) for a bus system (1), wherein the control node (3) is adapted to control a number of devices (6); comprising:

a control unit (31) configured to send an address-request-signal as soon as supply power is applied onto the control node (3) via at least one power supply line (7) at a first or second power supply terminal (33, 34) and to receive an address-allocation-signal including a unique address via at least one data line (8);

a switching unit (32) which is configured to electrically interconnect the first and second power supply terminal (33, 34) immediately and directly after control unit (31) detects that the address-allocation-signal has been received, wherein the switching unit (32) includes a first forward polarized diode (35) between the first power supply terminal (33) and the control unit (31) and a second forward polarized diode (37) between the second power supply terminal and the control unit (31), wherein a first bypass switch (36) is provided in parallel to the first forward polarized diode (35) and a second bypass (38) switch is provided in parallel to the second forward polarized diode (37), wherein the control unit (31) is configured to control the respective bypass switch (36, 38) to close via the respective power supply terminal immediately after powering on.

2. The control node (3) of claim 1, wherein the control unit (31) is configured to acknowledge the allocation of a unique address after receiving the address-allocation-signal.

3. The control node (3) of claim 1, wherein the control unit (31) is configured to store the unique address after receiving the address-allocation-signal.

4. The control node (3) of claim 1, wherein the control unit (31) is configured to control the remaining open bypass switches (36, 38) to close after the address-allocation signal has been received.

5. A bus system (1) comprising:

At least one control node (3) of claim 1, wherein the at least one control node (3) is connected to the number of devices (6) including conveyor drives of a conveying system;

a bus master (2) which is configured to receive an address-request-signal and to immediately transmit an address-allocation signal in response via the at least one data line (8).

6. The bus system, of claim 5, wherein at least one data line is provided which interconnects the at least one control node and the bus master (2), wherein the at least one power supply line has (7) portions to provide point-to-point interconnections between the bus master (2) and one of the first and second power supply terminal (33, 34) of the at least one control node (3) or between one of the first and second power supply terminal (33, 34) of one of the at least one control nodes (3) and one of the first and second power supply terminals (33, 34) of a further one of the at least one control nodes (3).

7. Method for operating a control node (3) for a bus system (29, wherein the control node (3) is adapted to control a number of devices (6); comprising the steps of:

After detecting application of a power supply onto the control node (3) via at least one power supply line (7) at a first or second power supply terminal (33, 34), transmitting an address-request-signal via an at least one data line (8);

Waiting to receive or receiving an address-allocation-signal including a unique address via the at least one data line (8);

electrically interconnecting the first and second power supply terminal (33, 34) immediately and directly after detecting that the address-allocation-signal has been received, wherein a switching unit (32) includes a first forward polarized diode (35) between the first power supply terminal (33) and a control unit (31) and a second forward polarized diode (37) between the second power supply terminal and the control unit (31), wherein a first bypass switch (36) is provided in parallel to the first forward polarized diode (35) and a second bypass (38) switch is provided in parallel to the second forward polarized diode (37), wherein the control unit (31) closes the respective bypass switch (36, 38) via the respective power supply terminal immediately after powering on.

* * * * *